(12) United States Patent
Herbert et al.

(10) Patent No.: US 8,489,660 B2
(45) Date of Patent: Jul. 16, 2013

(54) DIGITAL RANDOM NUMBER GENERATOR USING PARTIALLY ENTROPIC DATA

(75) Inventors: Howard C. Herbert, Phoenix, AZ (US); George W. Cox, Lake Oswego, OR (US); Shay Gueron, Haifa (IL); Jesse Walker, Portland, OR (US); Charles E. Dike, Hillsboro, OR (US); Stephen A. Fischer, Gold River, CA (US); Ernie Brickell, Hillsboro, OR (US); Martin G. Dixon, Portland, OR (US); David Johnston, Beaverton, OR (US); Gunendran Thuraisingham, Folsom, CA (US); Edward V. Gamsaragan, El Dorado Hills, CA (US); James S. Coke, Shingle Springs, CA (US); Greg W. Piper, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 750 days.

(21) Appl. No.: 12/459,142

(22) Filed: Jun. 26, 2009

(65) Prior Publication Data

US 2010/0332574 A1 Dec. 30, 2010

(51) Int. Cl.
*G06F 7/58* (2006.01)

(52) U.S. Cl.
USPC ........... 708/251; 708/252; 708/250; 708/254; 708/255; 380/44; 380/240

(58) Field of Classification Search
USPC ............... 708/254, 250–252; 380/44, 240
See application file for complete search history.

(56) References Cited

U.S. PATENT DOCUMENTS

| | | | |
|---|---|---|---|
| 6,061,702 A | 5/2000 | Hoffman | |
| 6,463,422 B1 | 10/2002 | Hangartner | |
| 6,643,374 B1 | 11/2003 | Wells et al. | |
| 6,687,721 B1 | 2/2004 | Wells et al. | |
| 6,728,893 B1 | 4/2004 | Wells et al. | |
| 6,792,438 B1 | 9/2004 | Wells et al. | |
| 7,047,262 B2 * | 5/2006 | Hars | 708/255 |
| 7,233,666 B2 | 6/2007 | Lee et al. | |
| 7,813,503 B2 * | 10/2010 | Campagna et al. | 380/44 |
| 7,831,752 B2 * | 11/2010 | Illowsky et al. | 710/62 |
| 8,015,224 B1 * | 9/2011 | Chaichanavong et al. | 708/254 |
| 8,189,778 B2 * | 5/2012 | Zhang | 380/44 |
| 8,219,602 B2 * | 7/2012 | Golic | 708/250 |
| 8,250,127 B2 * | 8/2012 | Kelly | 708/250 |
| 2005/0129247 A1 * | 6/2005 | Gammel et al. | 380/286 |
| 2008/0022039 A1 * | 1/2008 | Luo | 711/112 |
| 2008/0063190 A1 * | 3/2008 | Campagna et al. | 380/44 |
| 2009/0323967 A1 * | 12/2009 | Peirce et al. | 380/278 |
| 2010/0002877 A1 * | 1/2010 | Zhang | 380/46 |

OTHER PUBLICATIONS

Barker, E. et al., "Recommendation for Random Number Generation Using Deterministic Random Bit Generators" Revised, NIST, Mar. 2007.*
Jun, et al., "The Intel® Random Number Generator", Cryptography Research, Inc., White paper prepared for Intel Corporation, Apr. 22, 1999, pp. 1-8.

* cited by examiner

*Primary Examiner* — Tammara Peyton
(74) *Attorney, Agent, or Firm* — Trop, Pruner & Hu, P.C.

(57) ABSTRACT

A hardware-based digital random number generator is provided. The digital random number generator is a randomly behaving random number generator based on a set of nondeterministic behaviors. The nondeterministic behaviors include temporal asynchrony between subunits, entropy source "extra" bits, entropy measurement, autonomous deterministic random bit generator reseeding and consumption from a shared resource.

17 Claims, 9 Drawing Sheets

DIGITAL RANDOM NUMBER GENERATOR USING PARTIALLY ENTROPIC DATA

FIELD

This disclosure relates to processors and in particular to random number generators in processors.

BACKGROUND

Cryptographic algorithms and the protocols that use them require keys (which are based upon random numbers). For example, such keys can be secret/shared keys used by symmetric key algorithms such as Advanced Encryption Standard (AES) and Data Encryption Standard (DES) (used for block or stream encryption) and public/private key pairs used by asymmetric key algorithms such as Riverst, Shamir, Adleman (RSA) and Digital Signal Algorithm (DSA).

Random numbers are created by a random number generator. There are logically two kinds of random number generator: a True Random Number Generator (TRNG) and a Pseudo Random Number Generator (PRNG).

A TRNG can only be built using a HW-based "entropy source" and can produce a nondeterministic sequence of truly random numbers. The TRNG is often used to "seed" software PRNGs and is also known as a Nondeterministic Random Bit Generator (NRBG). The TRNG generates random numbers from a physical non-deterministic entropy source, such as white noise generated by a resistor, diode, or other electronic device, the time between radioactive particle decay, or other signal source that is essentially random.

A PRNG is an algorithm that given some "seed" will produce a deterministic sequence of pseudo random numbers and is also known as a Deterministic Random Bit Generator (DRBG). The PRNG generates random numbers using a deterministic process (that is, predictable given knowledge of the process) to generate a series of outputs derived from an initial seed state. That initial seed state is best if provided from a true random number generator. Most "random" number sources used in systems today are built in software and are based upon a pseudo-random generator.

PRNGs have historically been faster than TRNGs but PRNGs cannot generate a true random number because PRNGs employ deterministic algorithms. Thus, if the seed can be determined, the supposedly random numbers can be deterministically known The lack of high quality, high performance true TRNGs has resulted in computer system security failures.

BRIEF DESCRIPTION OF THE DRAWINGS

Features of embodiments of the claimed subject matter will become apparent as the following detailed description proceeds, and upon reference to the drawings, in which like numerals depict like parts, and in which:

DETAILED DESCRIPTION

"Securing" anything on a computer requires use of high quality cryptography which requires high quality keys. High quality keys require high quality random numbers/entropy. High quality random numbers/entropy requires a high quality Entropy Source (in hardware) and high quality (e.g., standards compliant) post processing certified as such (for example, via FIPS 140 2/3 Level 2).

High quality keys are foundational enablers of all cryptographic usages including: communications—all levels of all stacks (Extensible Markup Language (XML), Transport Layer Security (TLS), Virtual Private Network (VPN), Internet Protocol (IP), WiFi, WiMax); Signing—digital certificates, integrity manifests, attestation, transactions; Storage—file and volume privacy; and Digital Rights Management (DRM).

An embodiment of a Digital Random Number Generator (DRNG) is provided combines high quality hardware Entropy Source, standards compliant post processing, and other functionality into a single hardware element to meet these needs.

In an embodiment, a digital random number generator is provided which provides higher performance than a software-based random number generator.

Figure 1:
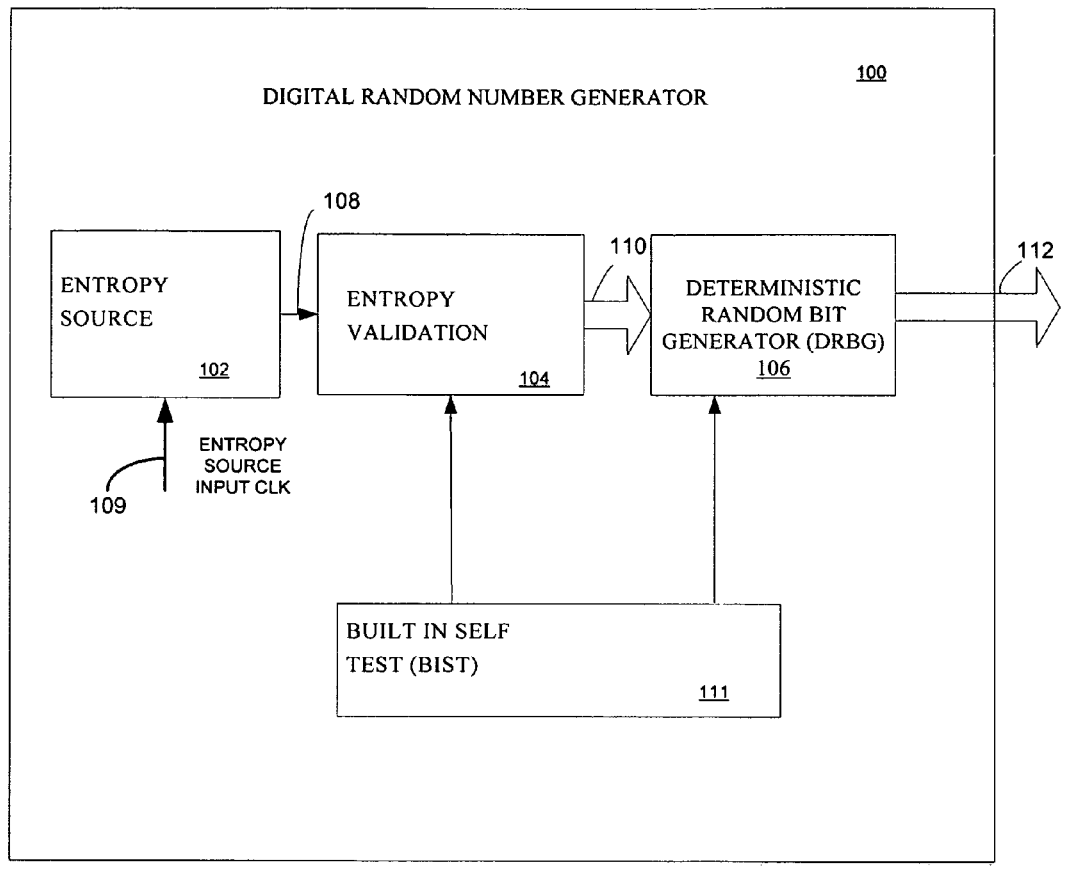
FIG. 1 is a block diagram of an embodiment of a hardware random number generator according to the principles of the present invention.

FIG. 1 is a block diagram of an embodiment of a digital random number generator 100 according to the principles of the present invention. The digital random number generator 100 includes a logically asynchronous pipeline with three stages (subunits or modules). In the embodiment shown, the three stages are: (1) entropy source 102; (2) entropy validation 104 and (3) Deterministic Random Bit Generator (DRBG) 106.

Entropy is a measure of randomness, that is, the degree of disorder or uncertainty in a system. A measure of randomness of a set of bits is a measure of the unpredictability of a next set of bits.

In the digital random number generator 100 shown in FIG. 1, entropy flows from the entropy source module 102 to the entropy validation module 104, and finally to the deterministic random number generator module 106.

The Entropy Source (ES) 102 generates partially entropic data. The partially entropic data is output as a stream of random bits and a data valid signal 108 that are synchronous with an entropy source input clock 109. In an embodiment, the stream of random bits (serial data) 108 output by the entropy source 102 has a minimum entropy greater than about 0.5 bits per bit.

The entropy validation module 104 parallelizes the received stream of random bits (serial partially entropic data) 108 and checks that the stream of random bits 108 meets a mathematical model of the entropy source 102 for the expected arrival rate of particular patterns of 1s and 0s.

The DRBG module 106 provides fully entropic data from the stream of random bits 108 received from the entropy validation module 102. The module 106 uses an algorithm that produces a sequence of bits from an initial value that is determined by a seed that is determined from the entropy input to the DRBG module 104. An algorithm is a clearly specified mathematical process for computation, that is, a set of rules that, if followed, will give a prescribed result. A seed is a string of bits that is used as input to the DRBG module. The seed determines a portion of the internal state of the DRBG, and its entropy must be sufficient to support the security strength of the DRBG.

In an embodiment, the DRNG 100 includes a Built in Self Test (BIST) unit (module) 111. The BIST module 111 is used after a power on reset to provide comprehensive test coverage of the entropy validation module 104 and DRBG module 106 and to perform health tests on the entropy source 102. In an embodiment, the comprehensive test coverage is performed using BIST Known Answer Tests. In addition, the Built In Self Test (BIST) performs signature analysis for manufacturing test.

Figure 2:
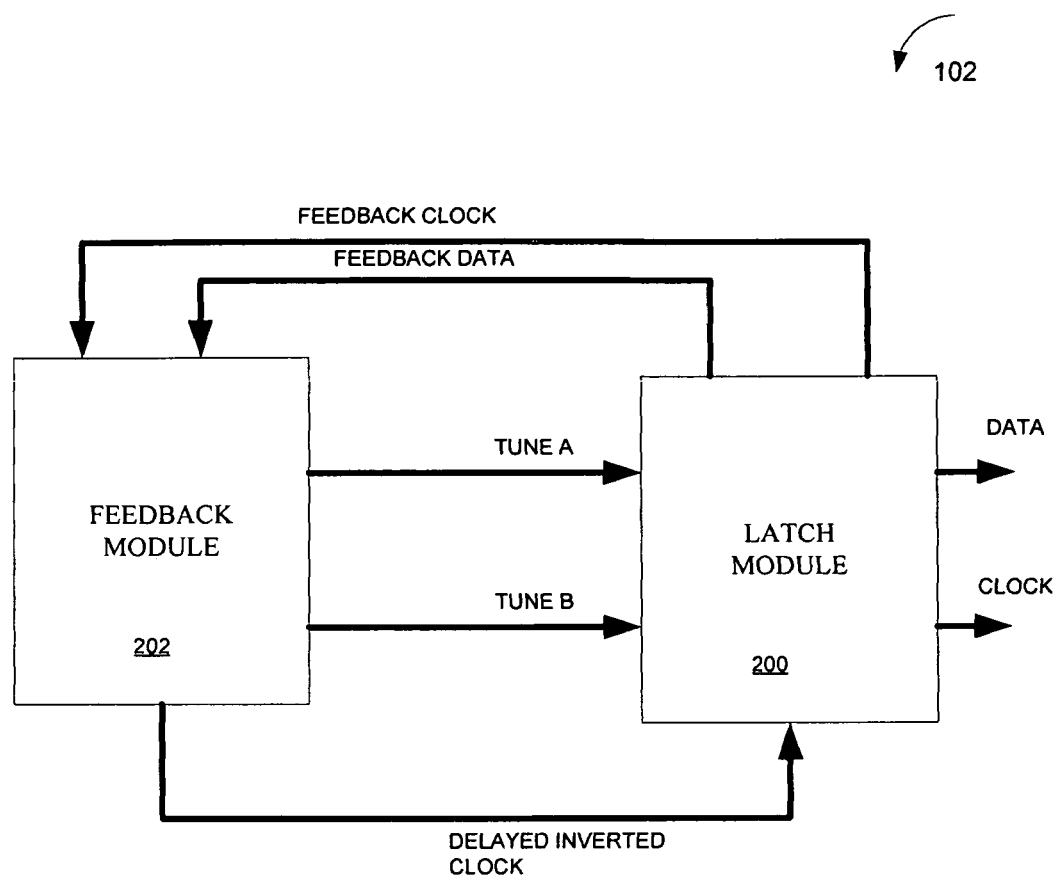
FIG. 2 is a block diagram of an embodiment of an entropy source shown in FIG. 1.

FIG. 2 is a block diagram of an embodiment of an entropy source 102 shown in FIG. 1. The entropy source 102 derives an entropic stream of bits from thermal noise (also called Johnson noise or Nyquist noise) which is a naturally occurring characteristic of electronic circuits and is caused by random thermal movement of electrons in electrically conducting materials. The entropy source 102 uses the thermal noise to generate random bit streams.

The entropy source 102 includes a latch module 200 and a feedback module 202. On each clock cycle, the latch module 200 is forced into a metastable state with settling/resolution controlled by thermal noise and the latch module 102 outputs a data bit (data) and a clock trigger (clock) after the state of the latch module 200 has stabilized. The feedback module 202 receives the result of the previous latch resolution (Feedback Data, Feedback clock) from the latch module 200 to determine how to bias the latch module 200 for the next clock cycle. The feedback module 202 sends this information (Tune A, Tune B) to the latch module 200 along with timing information (Delayed Clock).

Figure 3:
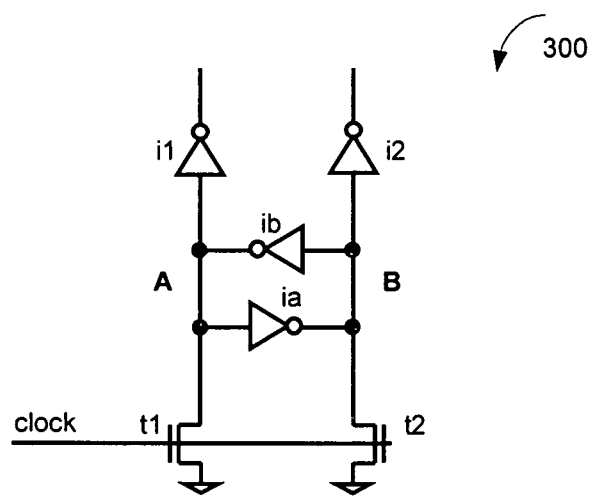
FIG. 3 is an embodiment of a latch circuit for the latch module shown in FIG. 2.

FIG. 3 is an embodiment of a latch circuit 300 for the latch module 200 shown in FIG. 2. In the embodiment shown, the latch circuit 300 has a differential output signal, that is, the output signals of inverter i1 and inverter i2. The latch circuit 300 also includes inverter ia, inverter ib, transistor t1 and transistor t2. In the embodiment shown, inverters i1, i2, ia and ib include PMOS devices.

When the clock signal is at a high voltage level (logic '1' or 'high'), nodes A and B are pulled to a low voltage level ("logic '0' or 'low'). In one embodiment, to pull nodes A and B low, the transistors t1 and t2 must overpower the PMOS devices in inverters ia and ib. In an alternate embodiment, the PMOS devices are turned off when the clock signal is high.

While the clock signal is high, the outputs of inverters i1 and i2 are high. When the clock changes state from high to low, one of the nodes (A or B) eventually switches to high while the other node is forced low. If everything in the circuit is perfectly balanced then only thermal noise determines which of the two nodes (A or B) switches to high. For example, if node A switches to high, node B is forced low. In this condition the output of i1 is forced low and the output of i2 remains high. With only thermal noise being the determining factor as to which node (A or B) switches to high, the output states are random with a 50% chance of node A switching to high.

However, because process variations can unbalance the latch circuit 300 so that it always ends up in one of the two states, the latch circuit 300 also includes a compensatory feedback loop to compensate for mismatched devices due to process, voltage and temperature variations.

Figure 4:
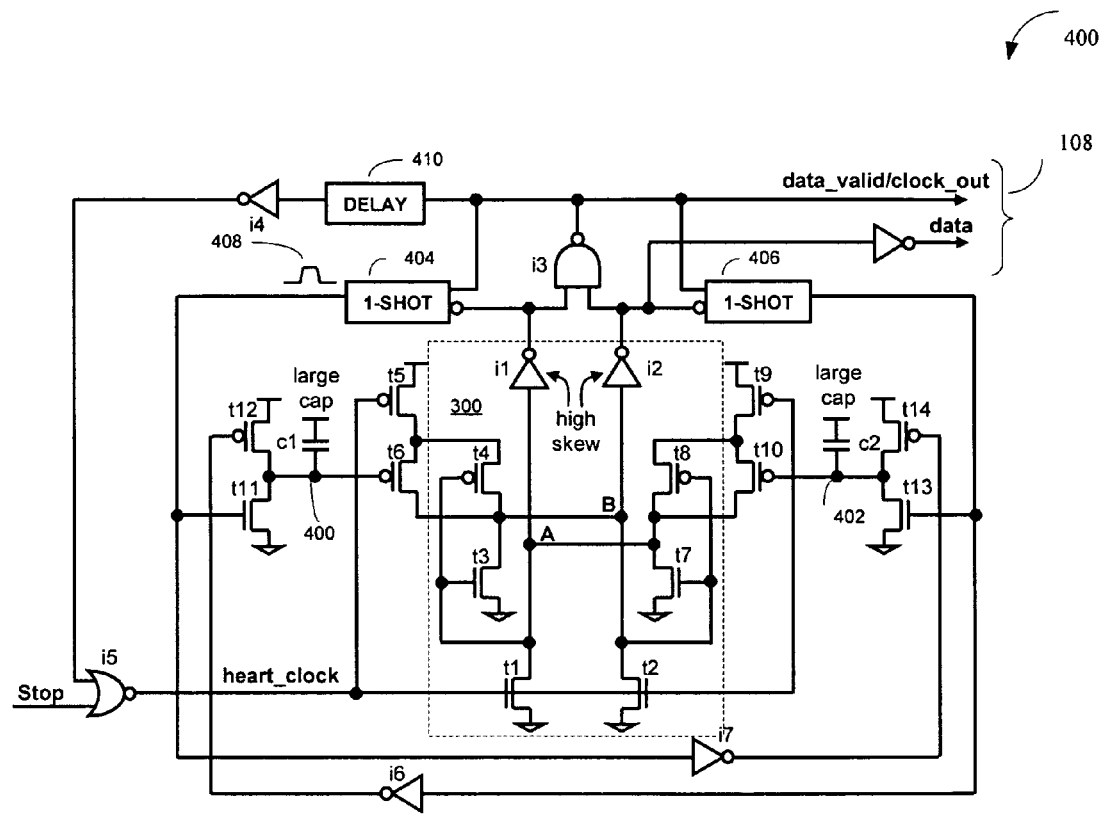
FIG. 4 is an embodiment of the trigger circuit for the latch module shown in FIG. 2.

FIG. 4 is an embodiment of an entropy source circuit 400 for the entropy source 102 shown in FIG. 1. The entropy source circuit 400 includes the latch circuit 300 discussed in conjunction with FIG. 3 with the inverter ia shown in FIG. 3 replaced with PMOS device t3 and PMOS device t4 and inverter ib shown in FIG. 3 replaced with PMOS device t7 and PMOS device t8.

Inverter ia (t4 and t3) shown in FIG. 3 are gated off by t5 when the clock is high and inverter ib (t8 and t7) shown in FIG. 3 are gated off by t9 when the clock is high. PMOS devices t6 and t10 are part of the feedback loop used to bias the latch circuit 300.

The entropy source circuit 400 is self-oscillating and self-biasing so that after operating for some time the voltage on capacitor c1 and capacitor c2 stabilizes at voltages fairly close to half of Vcc. The voltage at nodes 400, 402 is dependent on the size of the capacitor, device sizing, positive power supply voltage (Vcc), and skew in the design. The voltages on nodes 400, 402 are established by capacitors c1 and c2 so that the likelihood of the latch entering a metastability state is maximized.

The i1 inverter and i2 inverter threshold (input voltage level) are fixed so that when the latch is in a metastable state the nodes A and B are below the i1 and i2 thresholds. This prevents glitches on the data valid_signal and ensures a clean transition (from '1' to '0' and '1' to '0') for the heart_clock signal.

After the entropy source circuit 400 has been operating for a sufficient period of time, the entropy source circuit 400 achieves some equilibrium. When the heart_clock coupled to the gates of PMOS devices t1, t2, t5, and t9) goes low, the voltage at nodes A and B increases to a level where the latch 300 is at or near its metastability point. The latch 300 then has the potential to remain in a metastable state indefinitely but eventually resolves to a known state and begins a new cycle.

For example, if the latch resolves with node A high, one-shot 404 outputs a short high pulse 408. This high pulse at the gate of NMOS device t11, turns on NMOS device t11 and while NMOS device t11 is on, current flowing through NMOS device t11, dissipates a very small amount of the charge stored in capacitor c1. The reduction in the voltage level at the gate of PMOS device t6 biases PMOS device t6 resulting in PMOS device t6 pulling node B up faster on the next cycle than it did on the present cycle. The pulse from one-shot 406 at the gate of PMOS device t14 briefly turns on PMOS device t14 and NMOS device t11 causing charge to flow onto capacitor c2. This charge (and resulting increase in the voltage level at the gate of PMOS device t10 biases PMOS device t10 so that it will pull node A up slightly more slowly This creates a negative feedback. The node that goes high in one cycle is biased slightly to prefer to resolve to a low on the next cycle.

The amount of charge added to or removed from capacitors c1 and c2 generally causes the capacitor voltage to move less than 1 milli Volts (mv) on each clock cycle. The goal is to control the impact on nodes A and B so that the thermal noise is the dominant force in resolving the latch 300. The differential step size established by the charge on capacitors c1 and c2 and applied to nodes A and B when the heart_clock signal is low determines the amount of entropy produced. In an embodiment, based upon configuration parameters, the differential step size can be adjusted as needed.

The self-oscillating mechanism is provided by delay 410, inverter i4 and NOR-gate i5. When the latch 300 resolves, a high data_valid signal is produced along with a data bit. This high data_valid signal passes through a delay circuit 410, inverter i4 and NOR-gate i5 and then causes the heart_clock signal at the output of NOR-gate i5 to go high and the latch nodes A and B to be pulled low. This results in a low data_valid signal and after the delay the heart_clock signal transitions from high to low.

In an embodiment, the entropy source is self-oscillating and is synchronized to a slower clock domain than the other blocks in the digital random number generator 100. This allows pre-filtering of the raw data output from the entropy source 102. Also, as no physical entropy source is without some biases, the filtering results in further improvements to the entropy of the digital random number generator 100.

Figure 5:
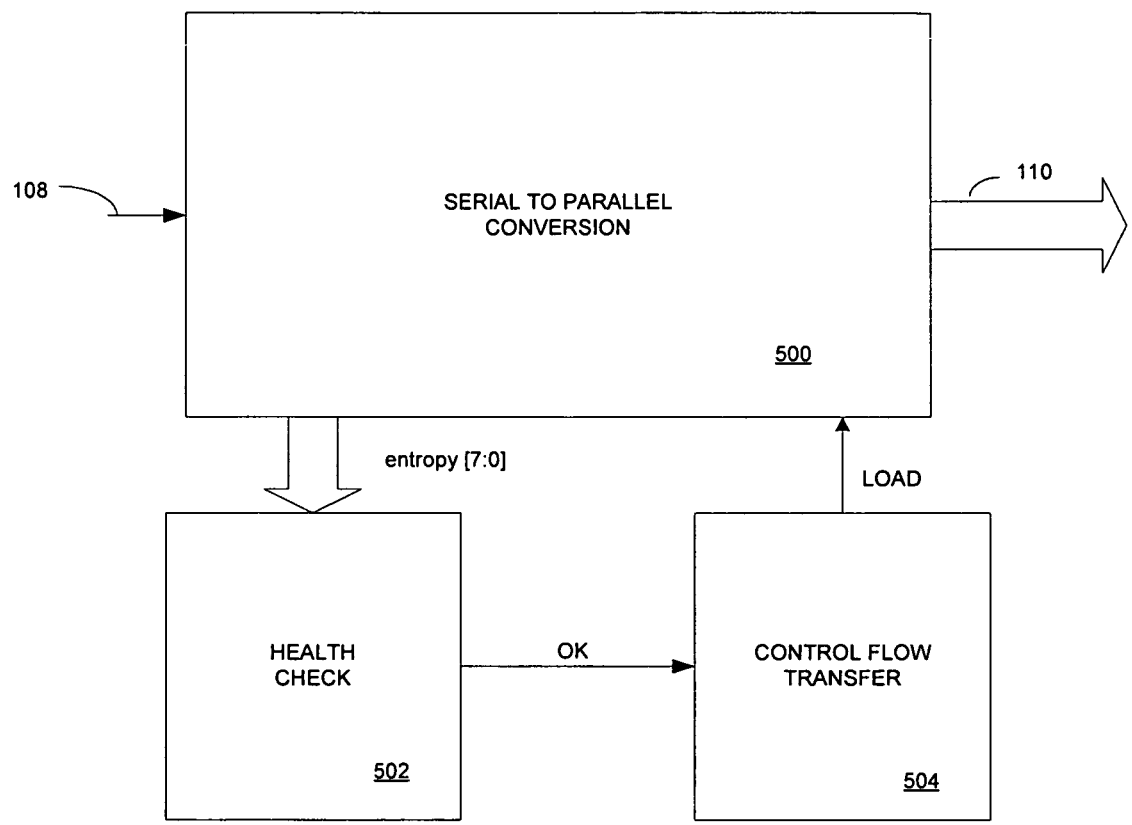
FIG. 5 is a block diagram of an embodiment of an entropy validation module shown in FIG. 1.

FIG. 5 is a block diagram of an embodiment of an entropy validation module 104 shown in FIG. 1.

The entropy validation module 104 dynamically measures the "fitness" of the entropy source generated "raw" entropy samples to the expected arrival rate/distribution of selected patterns based upon an entropy source model (for example, a mathematical model).

In the embodiment shown the entropy validation module includes a serial-to-parallel converter module 500, a health check module 502 and a control flow transfer module 504.

The serial-to-parallel converter module 500 receives the stream of random bits 108 from the entropy source 102 (FIG. 1) and converts the stream to a plurality of 8-bit blocks (bytes) which are then converted again to larger blocks, for example, 128-bit (16 bytes) or 256-bit (32 bytes) blocks.

The health check module 502 performs entropy source internal "raw" output testing by performing per sample (on one block of data) tests and statistics and M sample sliding window tests and statistics (on M blocks of data). In an embodiment, the health check module 502 counts the occurrences of six different bit patterns in each data block (128-bits or 256-bits) and checks that each of the plurality of bit patterns occur within statistical bounds. If they do, the data block is healthy.

For example, in an embodiment, the data block may be checked for the number of occurrences of the 4-bit pattern '0110'. For example, the bit pattern '0110' may be considered to be within statistical bounds if the number of occurrences of '0110' in a 256-bit data block is between 3 and 34. A number of such patterns may be counted in order to improve the reliability of the statistical test.

Figure 6:
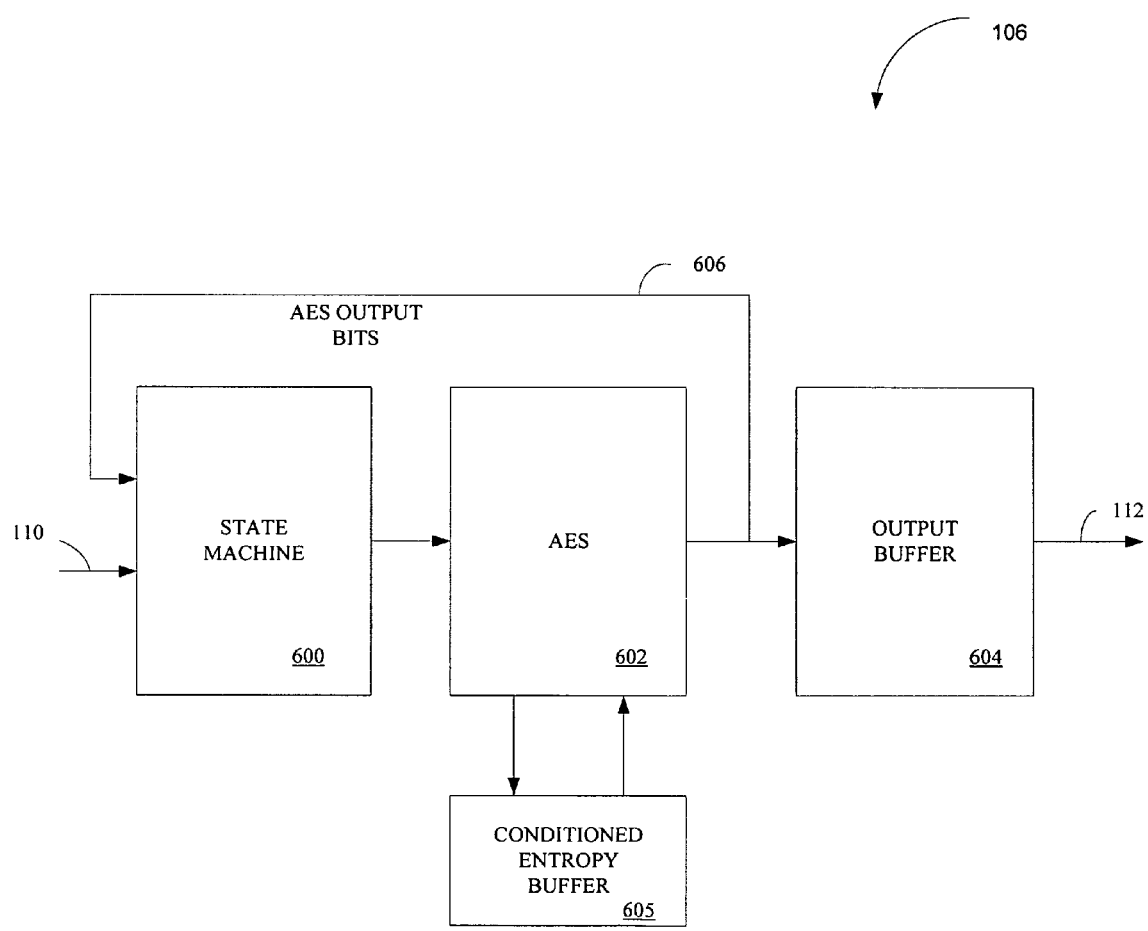
FIG. 6 is a block diagram of an embodiment of a deterministic random number generator shown in FIG. 1.

If the health check module 502 indicates that the block passed the health check (via the OK signal), the control flow transfer module 504 permits forwarding of the data block 110 to the DRBG module 106 (FIG. 1). In an alternative embodiment only the health status indicator is forwarded for making the determination that a reseed of the DRBG is required FIG. 6 is a block diagram of an embodiment of the deterministic random number generator 106 shown in FIG. 1. The deterministic random number generator includes a state machine 600, an Advanced Encryption Standard (AES) module 602, an output buffer 604 and a conditioned entropy buffer 605. The states in the state machine include reseed, generate and condition. In the generate state, the AES function is used to generate an output using the current internal state of the dynamic random bit generator and a new internal state is generated for the next request. In the reseed function, a new entropy input is acquired and combined with the current internal state to create a new seed and a new internal state.

In an embodiment, the DRBG module 106 provides fully entropic data using AES. AES published by the National Institute of Standards and Technology (NIST) as Federal Information Processing Standard (FIPS) 197 is a symmetric block cipher that can be used to encrypt and decrypt a block of data. Two blocks (128-bit or 256-bit blocks) of received partially entropic data are used by the DRBG module 104 while in the condition mode to provide a smaller quantity of fully entropic data. The AES encryption module 602 conditions entropy with AES in CBC-MAC mode and extends entropy via AES CTR mode.

The state machine 600 controls state variables, working variables, the AES module 602 and the inputs and outputs of the DRBG. The state machine 600 includes an initialize, reseed, generate and condition mode.

The AES encryption (cipher) module 602 performs a series of transformations using a secret key (cipher key) to transform intelligible data referred to as "plaintext" into an unintelligible form referred to as "cipher text".

In an embodiment each 256-bit block received from the entropy validation module 104 is conditioned using an AES-CBC-MAC mode construct. The conditioned entropy buffer 605 is provided for accumulating a pool of entropy from several "raw" entropy source samples from which entropy is extracted for (re)seeding the DRBG 106 (FIG. 1). In an embodiment, a 256-bit "conditioned" entropy output sample is generated from two 256-bit unconditioned samples received from the entropy validation module 104. A 256-bit output 112 may be generated using an AES-CTR mode construct.

In addition to generating a "random number", the digital random number generator 100 is a "randomly behaving" (or nondeterministically behaving) random number generator. Nondeterministic behaviors, beyond the nondeterminacy of the bit sequence generated by the entropy source 102, add to the overall unpredictably of the output entropic bit stream 112. In an embodiment, a set of nondeterministic behaviors provided by the digital random number generator 100 includes temporal asynchrony, entropy source "extra" bits, entropy measurement and autonomous digital random number generator reseeding. These nondeterministic behaviors will be described in greater detail below.

Each subunit (module) of the digital random number generator 100, that is, entropy source module 102, entropy validation module 104 and conditioner and DRBG module 106 operate asynchronously to each other. Thus, the digital random number generator 100 is logically a three stage/subunit (module) asynchronous production pipeline. Each module has a logical "output queue" between the module and the next downstream module for "flow control" purposes. Therefore, there is unpredictable dynamic synchronization dependent on the production rate of the upstream module and the consumption rate of the next downstream module, that is, there is temporal asynchrony between modules.

In an embodiment, the entropy source 102 outputs a highly entropic output bit stream, for example, greater than 0.9 bits of entropy per output bit. As discussed earlier, the entropy source runs asynchronously relative to the other modules in the digital random access generator.

In an embodiment the frequency of the entropy source input clock 109 for the entropy source module 102 is greater than the frequency of a clock input to the other modules. Thus, the entropy source module 102 can produce an internal entropic bit stream at several times the clock rate of the other modules (logic), for example, 2-5 times as fast. This allows a subset of the bits from the internal entropic bit stream output from the entropy source module 102 to be selected by a synchronization mechanism for use. Thus, the bits selected from the entropy source's internal entropic bit stream is unpredictable.

For example, in one embodiment one of every three bits or one of every five bits generated by the entropy source module 102 may be selected and the other ("extra") bits discarded (dropped). In another embodiment, an Exclusive OR (XOR) operation is performed on the extra bits and the result of the XOR operation is forwarded in the selected output bit stream. Thus, the number of bits selected to be forwarded from the entropy source 102 is dependent on the frequency of the digital logic sampling clock relative to frequency of the entropy source clock.

As discussed earlier, based on a mathematical module of the entropy source 102, there are expected occurrence rates or distributions of selected bit string patterns in the entropic bit stream output by the entropy source module 102. The entropy validation module 104 dynamically measures the Entropy Source's entropic bit stream for compliance to the model.

Per sample tests/statistics and per M sample window tests/statistics are used. In an embodiment, entropy measurement based on per sample tests/statistics is performed using 1, 2, 3, and 4 bit patterns applied to moving bit sequence windows to accumulate occurrence/distribution statistics across each 256 bit entropy source output sample. Acceptability count/statistics ranges per pattern are derived from expected distributions based upon the mathematical model and continually repeated one sample after another.

In an embodiment, entropy measurement using per M sample window tests/statistics is performed using a long window M (64K bits=256 samples of 256 bits/samples). The window is dynamically moved back in time (most recent M samples) and continually repeated (one sample after another). The measurement of output goodness is N of M samples "passed" per sample tests, with N chosen empirically from simulations and test chip behavior.

Based upon configuration parameters of both the per sample expected occurrence rates or distributions of selected bit string patterns and N (from N of M) recent "passing" samples, the number of samples from the entropy source 102 forwarded to the deterministic random bit generator 106 prior to a conditioning operation and (subsequently) a reseeding operation varies based upon the dynamic fit of the entropy source samples to the model's distribution curve.

Generating too many outputs using the same seed may provide sufficient information for predicting future outputs. Reseeding is a method to acquire additional bits with sufficient entropy for the desired security strength. A dynamic random bit generator 106 may be periodically reseeded. Thus, periodic reseeding may be used to reduce security risks. Typically, a seed has a finite seed life, that is, the number of outputs produced during a predefined time period.

In contrast to performing periodic reseeding, in an embodiment, the deterministic random number generator 106 is reseeded as often as is convenient without interfering with consumption from the deterministic random number generator 106. The ability to reseed is based upon the relative performance advantage of the entropy source 102, that is, the number of bits per second of the serial stream produced by the entropy source 102.

Thus, another nondeterministic behavior is autonomous DRBG Reseeding. Based upon configuration parameters, the deterministic random bit generator 106 autonomously requests that it be reseeded. The "freshness" of the entropy pool in the deterministic random bit generator 106 is an indicator as to the likely quality of entropy of the output of the deterministic random bit generator 106. Autonomous reseed enabling is controlled by running measurements of the "quality" of entropy being produced by the entropy source 102 and the deterministic random bit generator's entropy state "freshness". The "freshness" of the entropy is based on whether the entropy has its original qualities unimpaired.

In CTR mode, during reseed events in the Deterministic Random Bit generator 106, conditioned entropy stored in the conditioned entropy buffer 605 is used in the output generation. In one embodiment, the reseed occurs whenever there are no requests to generate and the Digital Random Number generator has filled all available memory (for example, external queues) for storing random numbers before "turning itself off". In another embodiment, the reseed occurs when a count-based limit on entropy "staleness" generated by the deterministic random number generator 106 is exceeded and given that the conditioner guarantees that if its inputs have >0.5 bit/bit entropy, the conditioner's output for reseeding the deterministic random bit generator 106 is 1.0 bit/bit entropy.

When invoked, in response to the "(re)seed request, the state machine in the deterministic random bit generator 106 enters the reseed state. In the reseed state, the autonomous reseed enabling criteria tests are performed. These tests include successfully passing two entropy source samples (512 bits) through the entropy source measurement tests to the conditioner, successfully applying the N of M quality criteria to each sample to qualify it and the long term/recent state of the entropy source and accumulating unqualified ES outputs (before or after either of the qualified ES outputs) in the conditioner (irrespective of the entropy source measurement state). After two qualified ES samples (512 bits) have been successfully passed to the conditioner, the request from the deterministic random bit generator 106 for "(re)seeding" (requiring 256 bits) is satisfied by the conditioner.

Figure 7:
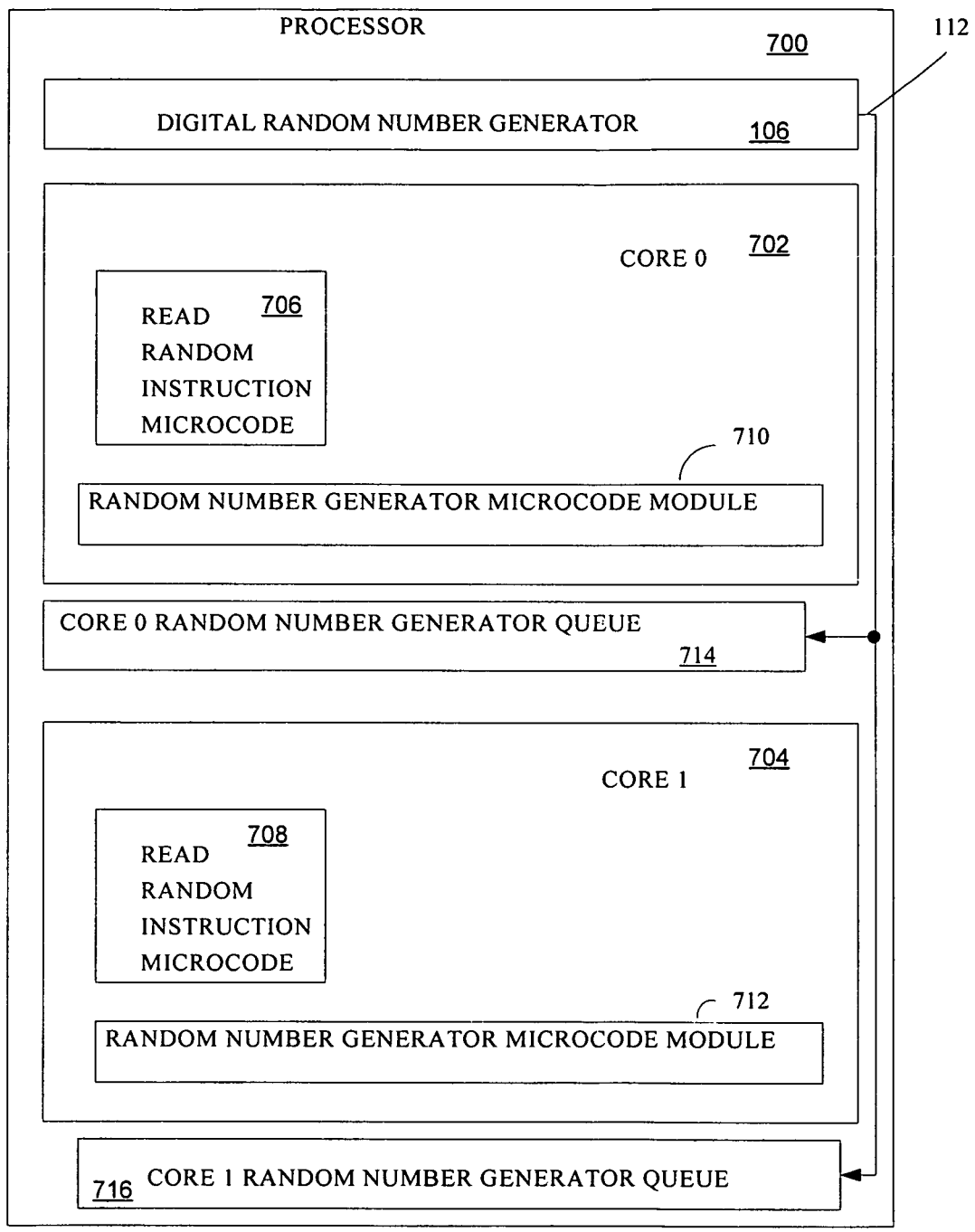
FIG. 7 is a block diagram of an embodiment of a processor that includes a plurality of cores and the hardware random number generator shown in FIG. 1.

FIG. 7 is a block diagram of an embodiment of a processor 700 that includes a plurality of cores (processor cores) 702, 704 and the digital random number generator (DRNG) 106 shown in FIG. 1.

In the embodiment shown in FIG. 7, each of the plurality of processor cores 702, 704 includes Read Random Instruction microcode 706, 708 and Random Number Generator (RNG) microcode (uCode) 710, 712. The DRNG 106 automatically fills a processor core-specific RNG Queue 714, 716 to service uCode random number requests for that core 702, 704.

The Deterministic Random Bit Generator (DRBG) 106 generates the final random numbers that are loaded into the RNG Queues 714, 716. In an embodiment, the DRBG 106 can be implemented using a variety of NIST approved algorithms, for example, AES, SHA-256, ANSI X9.82, NIST SP 800-90) and NIST FIPS 140-2/3 Level 2.

In another embodiment, there can be more than one DRNG 106 to achieve different power or performance requirements, for example, instead of one DRNG 106 shared by a plurality of processor cores 702, 704, there can be one DRNG 106 per processor core 702, 704. Likewise, the depth of the RNG queue 714, 716 can be varied to achieve different power or performance requirements.

In another embodiment, the RNG queuing mechanism can be split between a shared queue at the output of the DRNG and processor core-specific RNG Queues 714, 716 to achieve different power or performance requirements.

In yet another embodiment, instead of having one core-specific RNG Queue 714, 716 per core, there may be a single RNG Queue shared by the processor cores 702, 704.

From a power management perspective, the DRNG 106 and the RNG Queue(s) 714 716 are outside of the processor core power-well, that is, in logic shared by a plurality of processor cores 702, 704. Thus, there is no impact to processor core power management operations. Entropy can be "computed ahead" and stored for later consumption. Thus, when sufficient random numbers have been stored in the RNG queue 714, 716, the DRNG 100 can automatically "turn itself off" by turning off the clock in order to save power.

If all of the RNG Queues 714, 716 are full, the clock to the DRNG 106 can be turned off while the clock is still provided to the RNG Queues 714, 716 to allow the RNG Queues 714, 716 to provide random data in response to uCode requests. Upon detecting that the RNG Queue 714, 716 stores less than a threshold amount of random data, the clock can be provided to the DRNG 106 so that the DRNG 106 can supply the RNG queue 714, 716 with random data. When all RNG Queues 714, 716 are full, the clock to the DRNG 196 can again be turned off.

Furthermore, if a processor core 702, 704 is in a low-power (sleep) mode and then returns to full power mode, there is no additional latency for the processor core 702, 704 to receive random data from the RNG Queue 714, 716 because the clock continues to be provided to the RNG Queue 714, 716 while the processor core 702, 704 is in sleep mode.

In the embodiment shown in FIG. 7, the deterministic random bit generator 106 is a shared resource because it is shared by multiple processor cores 702, 704. In addition to being shared by multiple processor cores 702, 704, the deterministic random bit generator 106 is shared amongst multiple hardware threads per processor core 702, 704, multiple virtual machines in the system, multiple operating systems across multiple virtual machines and multiple applications per operating system.

Another nondeterministic behavior is consumption from a shared resource. The asynchronous behavior and dynamic consumption rates of consumers (for example, an application program or thread) make which consumer will get which sample from the output stream of the deterministic random bit generator 106 dynamically unpredictable and adds disruption to the visibility, by any single consumer, of the sequence of outputs from the deterministic random bit generator 106.

Several consumption-based factors can generate different asynchronous delivery patterns, for example, the "fairness" guarantees over consumption to avoid Denial of Service (DOS)-based "starvation" by multiple consumers; the multiple queues between the deterministic random bit generator 106 and consumers, particularly if depth greater than 1 and the width of entropy consumption (for example, 32 or 64 bits), when incrementally consumed from a single output of a 128 bit deterministic random bit generator 106.

Consumption-based factors can also affect the "reseed rate" of the deterministic random bit generator because one of the reseed triggers is deterministic random bit generator 106 "quiescence", momentary lapses in dynamic shared consumption cause abrupt unpredictable changes in the sequences of deterministic random bit generator 106 output.

The dynamic combination of these nondeterministic behaviors makes it unlikely that, even with knowledge of one or more items of the internal state of the deterministic random bit generator 106 allows successful prediction of future outputs of the DRNG 100.

In an embodiment, a macroinstruction (read random instruction) is provided that can be used by cryptographic protocols to obtain a random number generated by the DRNG 106. The random number can be used to generate public/private keypairs. The read random instruction microcode 706, 708 for the read random macroinstruction is stored in the core 702, 704.

The macroinstruction syntax is as follows:

RDRAND r16/32/64 where 'r16/32/64' specifies a destination register in which the random data output from the DRNG 106 is stored. The size (number of bits) of the random data is dependent on the destination register size (for example, 16-bits, 32-bits or 64-bits). The state of an arithmetic carry flag indicates whether the value stored in the destination register is entropic, that is, whether (or not), when the RDRAND instruction was executed there was random data available in the RNG Queue. If no entropy is currently available, a predefined mechanism can be used to retry the RDRAND until entropy becomes available.

The availability of the RNRAND macroinstruction improves performance of the operating system and security-related applications by providing a single instruction to obtain a random number in contrast to each operating system and security-related application having to individually create a source of random numbers. In an embodiment, the RDRAND macroinstruction is available for use in all privilege levels and all operating modes of the processor 700. The DRNG also provides random numbers for use by internal microcode (uCode) functions, for example, microcode functions that use random numbers.

Figure 8:
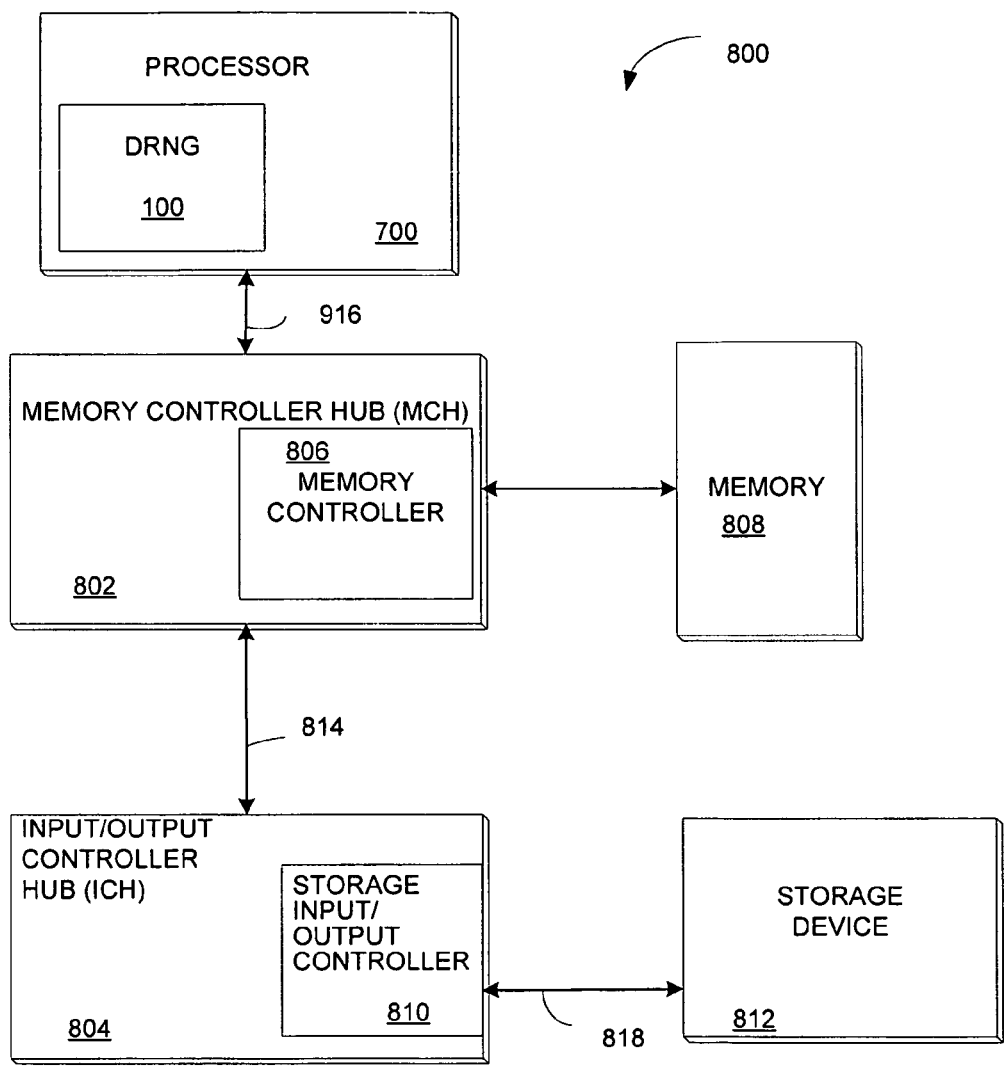
FIG. 8 is a block diagram of an embodiment of a system that includes the processor shown in FIG. 7.

FIG. 8 is a block diagram of an embodiment of a system 800 that includes the deterministic random bit generator 106 shown in FIG. 1. The system 800 includes a processor 700, a Memory Controller Hub (MCH) or (Graphics Memory Controller Hub (GMCH)) 802 and an Input/Output (I/O) Controller Hub (ICH) 804. The MCH 802 includes a memory controller 806 that controls communication between the processor 700 and memory 808. The processor 700 and MCH 802 communicate over a system bus 816.

The processor 700 includes a DRNG 100 and may be a multi-core processor such as Intel® Pentium D, Intel® Xeon® processor, or Intel® Core® Duo processor or any other type of processor.

The memory 808 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 804 may be coupled to the MCH 802 using a high speed chip-to-chip interconnect 814 such as Direct Media Interface (DMI). DMI supports 2 Gigabit/second concurrent transfer rates via two unidirectional lanes.

The ICH 804 may include a storage I/O controller 810 for controlling communication with at least one storage device 812, for example, a disk drive or a Redundant Array of Independent Disks (RAID). The ICH 804 may communicate with the storage device 812 over a storage protocol interconnect 818 using a serial storage protocol such as, Serial Attached Small Computer System Interface (SAS) or Serial Advanced Technology Attachment (SATA).

In an embodiment, the DRNG (both NRBG and deterministic random bit generator 106 units and their states) are protected from a software attack Shared Resource across "n" processor cores, threads, Virtual Machines (VMs), and applications in the system. The Digital Random Number Generator scales under multiple consumer load power management and has a self scheduling, compute ahead, low latency, consumption driven, queued interface.

Figure 9:
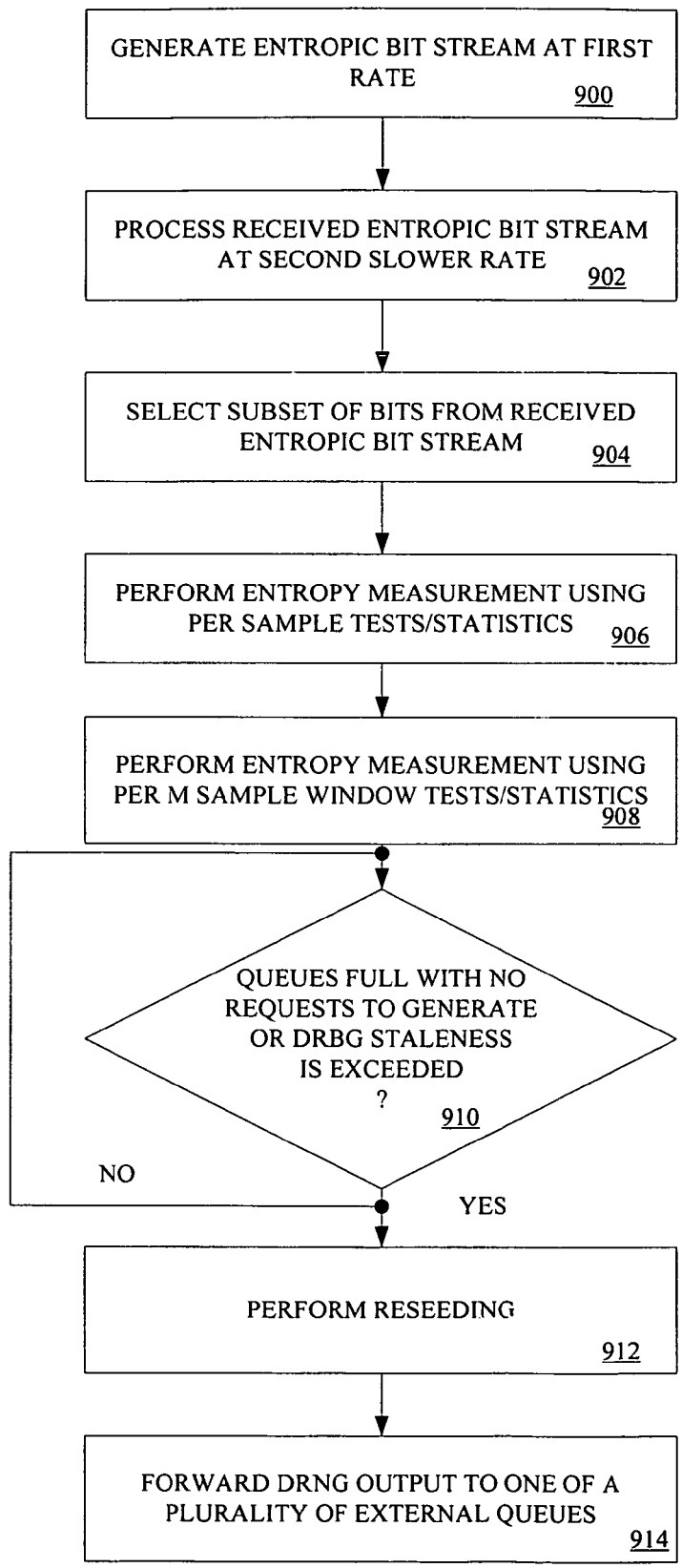
FIG. 9 is a flow graph of a method for providing a randomly behaving random number generator according to the principles of the present invention; and Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

FIG. 9 is a flow graph of a method for providing a randomly behaving random number generator according to the principles of the present invention. The digital random number generator 100 is a randomly behaving random number generator based on a set of nondeterministic behaviors.

Referring to FIG. 1, the digital random number generator 100 includes an entropy source 102 that receives an entropy source input clock 109, an entropy validation module 104 and a deterministic random bit generator 106.

Returning to FIG. 9, at block 900, the entropy source 102 generates an entropic bit stream at a rate dependent on the frequency of the entropy source input clock 109.

At block 902, the entropy validation module 104 which operates at a slower clock frequency than the entropy source input clock 109 receives the entropic bit stream and processes the entropic bit stream at a slower rate than the entropic stream is generated by the entropy source 102. Dependent on the entropy source production rate and the consumption rate of the entropy validation module 104, unpredictable dynamic synchronization behaviors ensue.

At block 904, further nondeterminism is added to the behavior of the entropy source 102 based on how bits are selected from the received entropic bit stream and how unselected bits are handled. For example, in an embodiment, one of every three received bits may be selected and the nonselected bits may be discarded. In another embodiment, one of every five bits may be selected and the nonselected bits may be XORed together into the output bit stream.

At block 906, per sample tests are performed. The entropic bit stream is measured for compliance to a model by applying 1, 2, 3 and 4 bit patterns to moving bit sequence windows to accumulate occurrence/distribution statistics across each output sample, for example, a 256-bit sample. Acceptability count/statistics ranges (per pattern) are derived from expected distributions based upon an entropy source mathematical model.

At block 908, per M sample window tests/statistics are performed. The per sample tests/statistics discussed in conjunction with block 906 are performed on each sample for M samples. A measure of entropy source goodness is than N of the M samples passed with N chosen empirically from simulations. For example, for 256-bit samples, M may be 256, that is, the M sample window is 64K bits.

At block 910, the dynamic random bit generator performs autonomous reseeding based on the quality of the entropy bit stream, that is, based on the measurements performed by block 906 and block 908 and also based on the consumption rate of the entropy bit stream queued and stored in a buffer. If the buffer (queue) is full or the entropy bit stream quality indicates that the entropy is stale, processing continues with block 912.

At block 912, the digital random bit generator is reseeded.

At block 914, further nondeterminism is added in an embodiment in which the DRNG 100 is a shared resource. Dynamic consumption rates of consumers generate asynchronous delivery patterns.

The dynamic combination of these nondeterministic behaviors makes it unlikely that, even with knowledge of the internal state of the DRNG that one could successfully predict future outputs from the DRNG.

An embodiment is described for generation of random numbers entirely in hardware by a Digital Random Number Generator (DRNG). In other embodiments a mix of hardware, microcode or logic shared by a plurality of cores may be used to generate the random numbers.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
a processor including:
an entropy validation module to receive a partially entropic bit stream from an entropy source and to measure and report the entropic quality of the partially entropic bit stream and to output the partially entropic bit stream as a block of raw entropy data; and
a deterministic random number generator to receive the block of raw entropy data from the entropy validation module and to condition the block of raw entropy data to provide a block of entropy data, the unpredictability of the block of entropy data dependent on a dynamic combination of a plurality of nondeterministic behaviors, wherein the entropy source is to operate asynchronously to the entropy validation module and the deterministic random number generator, and one of the plurality of nondeterministic behaviors is dependent on a difference between production rates and consumption rates of the entropy validation module, the entropy source and the deterministic random number generator.

2. The apparatus of claim 1, wherein the entropy source to operate at a second clock frequency to generate a partially entropic serial bit stream, the second clock frequency greater than a first clock frequency.

3. The apparatus of claim 2, wherein one of the plurality of nondeterministic behaviors is a relative rate of bit selection from the partially entropic serial bit stream for use by the entropy validation module.

4. The apparatus of claim 3, wherein another one of the plurality of nondeterministic behaviors is use of non-selected bits from the partially entropic serial bit stream.

5. The apparatus of claim 1, wherein one of the plurality of nondeterministic behaviors is quality of the entropy produced by the entropy source.

6. The apparatus of claim 5, wherein the quality is measured by dynamically measuring occurrence rates of bit string patterns applied to moving bit sequence windows in the block of raw entropy data and comparing the occurrence rate of the bit string patterns with a model using per window sample statistics.

7. The apparatus of claim 6, wherein the per window sample statistics for N of M bit sequence windows provides an indication of the quality of the entropy.

8. The apparatus of claim 7, wherein one of the plurality of nondeterministic behaviors is autonomous reseeding of the deterministic random bit generator based on the indication of the quality of the entropy.

9. A method comprising:
generating, by an entropy validation module of a processor, a block of raw entropy data from a partially entropic bit stream received from an entropy source; and
providing a conditioned block of entropy data, by a deterministic random number generator of the processor,
by conditioning the block of raw entropy data received from the entropy validation module, the unpredictability of the block of conditioned entropy data dependent on a dynamic combination of a plurality of nondeterministic behaviors, wherein the entropy source, the entropy validation module and the deterministic random number generator to operate asynchronously, and one of the plurality of nondeterministic behaviors is dependent on a difference between production rates and consumption rates of the entropy validation module, the entropy source and the deterministic random number generator.

10. The method of claim 9, wherein the entropy source to operate at a second clock frequency to generate a partially entropic serial bit stream, the second clock frequency greater than a first clock frequency.

11. The method of claim 10, wherein one of the plurality of nondeterministic behaviors is a relative rate of bit selection from the partially entropic serial bit stream for use by the entropy validation module.

12. The method of claim 11, wherein another one of the plurality of nondeterministic behaviors is use of non-selected bits from the partially entropic serial bit stream.

13. The method of claim 9, wherein one of the plurality of nondeterministic behaviors is quality of the entropy produced by the entropy source.

14. The method of claim 13, further comprising:
measuring the quality of the entropy by dynamically measuring occurrence rates of bit string patterns applied to moving bit sequence windows in the block of raw entropy data and comparing the occurrence rate of the bit string patterns with a model using per window sample statistics.

15. The method of claim 14, wherein the per window sample statistics for N of M bit sequence windows provides an indication of the quality of the entropy.

16. The method of claim 15, wherein one of the plurality of nondeterministic behaviors is autonomous reseeding of the deterministic random bit generator based on the indication of the quality of the entropy.

17. A system comprising:
a random access memory to store an application program; and
a processor comprising:
  a plurality of processor cores, at least one of the processor cores including read random instruction microcode;
  one or more random number generator queues, to store random numbers for use by the plurality of processor cores;
  a digital random number generator comprising:
    an entropy validation module to receive a partially entropic bit stream from an entropy source and to format the partially entropic bit stream into a block of raw entropy data; and
    a deterministic random number generator to receive the block of raw entropy data from the entropy validation module and to condition the block of raw entropy data to provide a block of entropy data to one of the random number generator queues for use by the read random instruction microcode in response to a request for a random number by an application program, the unpredictability of the block of entropy data dependent on a dynamic combination of a plurality of nondeterministic behaviors, wherein the entropy source is to operate asynchronously to the entropy validation module and the deterministic random number generator and one of the plurality of nondeterministic behaviors is dependent on a difference between production rates and consumption rates of the entropy validation module, the entropy source and the deterministic random number generator.

* * * * *